(12) United States Patent
Brown

(10) Patent No.: US 8,316,576 B1
(45) Date of Patent: Nov. 27, 2012

(54) DIVING RATTLE LURE

(75) Inventor: Bruce Brown, Van Buren, AR (US)

(73) Assignee: EBSCO Industries, Inc., Birmingham, AL (US)

( * ) Notice: Subject to any disclaimer, the term of this patent is extended or adjusted under 35 U.S.C. 154(b) by 218 days.

(21) Appl. No.: 12/582,358

(22) Filed: Oct. 20, 2009

Related U.S. Application Data

(60) Provisional application No. 61/180,857, filed on May 23, 2009.

(51) Int. Cl.
*A01K 85/01* (2006.01)

(52) U.S. Cl. ...................... 43/42.31; 43/42.39

(58) Field of Classification Search ............ 43/42.31, 43/42.39
See application file for complete search history.

(56) References Cited

U.S. PATENT DOCUMENTS

| | | | | |
|---|---|---|---|---|
| 841,429 | A * | 1/1907 | Passage | 43/42.31 |
| 1,870,559 | A * | 8/1932 | Drake | 43/42.31 |
| 2,270,487 | A * | 1/1942 | Withey | 43/42.31 |
| 2,488,678 | A * | 11/1949 | Nardi | 43/42.31 |
| 3,894,350 | A * | 7/1975 | Parker | 43/42.31 |
| 3,979,853 | A * | 9/1976 | Storm et al. | 43/42.31 |
| 4,008,539 | A * | 2/1977 | Gardner | 43/42.31 |
| 4,223,469 | A * | 9/1980 | Luz | 43/42.31 |
| 4,453,335 | A * | 6/1984 | Smith | 43/42.31 |
| 4,483,091 | A * | 11/1984 | Norlin | 43/42.31 |
| 4,744,169 | A * | 5/1988 | Nochta | 43/42.31 |
| 4,747,228 | A * | 5/1988 | Giovengo, Jr. | 43/42.31 |
| 4,785,569 | A * | 11/1988 | Thomas, Jr. | 43/42.31 |
| 4,791,750 | A * | 12/1988 | Gammill | 43/42.31 |
| 4,918,854 | A * | 4/1990 | Webre, Jr. | 43/42.31 |
| 5,024,019 | A * | 6/1991 | Rust et al. | 43/42.31 |
| 5,121,568 | A * | 6/1992 | Lindmeyer | 43/42.31 |
| 5,134,799 | A * | 8/1992 | Trnka | 43/42.31 |

(Continued)

FOREIGN PATENT DOCUMENTS

EP 913086 A1 * 5/1999

(Continued)

OTHER PUBLICATIONS

Buster Jerk (EG-048): Strike Pro America, Casting into the Future!, retrieved from the internet on the Strike Pro Lures web page: www.strikeprolures.com/lures/index.php?main_page=product_info&cPath=2_5&products_id=16 (available at least as early as Dec. 1, 2008).

*Primary Examiner* — Darren W Ark
(74) *Attorney, Agent, or Firm* — Smith Gambrell & Russell LLP

(57) ABSTRACT

A fishing lure for producing a desired sound as the lure sinks in a fluid has a proximal end and a distal end, a first side wall and a second side wall between the proximal end and the distal end, and an upper surface and a lower surface between the proximal end and the distal end. A central chamber is positioned in the body between the lower surface and the upper surface and intermediate the front end and the rear end of the body. A rib is positioned in the central chamber proximate the lower surface. An upper weight and a lower weight are housed in the central chamber, with the lower weight detachably lodged proximate the rib in the central chamber. The upper weight pivots about the lower central weight as the lure sinks in the fluid to generate the desired sound vibrations.

10 Claims, 4 Drawing Sheets

U.S. PATENT DOCUMENTS

| | | | | |
|---|---|---|---|---|
| 5,561,938 A | * | 10/1996 | Kato et al. | 43/42.31 |
| 5,566,498 A | * | 10/1996 | Itoh | 43/42.31 |
| 5,822,912 A | * | 10/1998 | Kato et al. | 43/42.31 |
| 5,926,995 A | * | 7/1999 | Dubois | 43/42.31 |
| 5,992,084 A | * | 11/1999 | Kitagawa | 43/42.31 |
| 6,155,000 A | * | 12/2000 | Ravencroft | 43/42.31 |
| 6,978,571 B1 | * | 12/2005 | Nemire | 43/42.31 |
| 7,310,906 B1 | * | 12/2007 | Woller, Sr. | 43/42.31 |
| 7,712,245 B1 | * | 5/2010 | Jarboe | 43/42.31 |
| 7,827,730 B1 | * | 11/2010 | Jensen et al. | 43/42.31 |
| 2003/0093939 A1 | * | 5/2003 | Salonen et al. | 43/42.22 |
| 2006/0053678 A1 | * | 3/2006 | Amsler | 43/42.31 |
| 2006/0174535 A1 | * | 8/2006 | Beer et al. | 43/42.31 |
| 2007/0107295 A1 | * | 5/2007 | Kaptis | 43/42.39 |
| 2008/0104878 A1 | * | 5/2008 | Woller, Sr. | 43/42.31 |
| 2009/0084021 A1 | * | 4/2009 | Bialobrzeski et al. | 43/42.31 |
| 2009/0113783 A1 | * | 5/2009 | Hollomon | 43/42.31 |
| 2010/0000145 A1 | * | 1/2010 | Leppala | 43/42.31 |
| 2010/0031554 A1 | * | 2/2010 | Brooks et al. | 43/42.31 |
| 2010/0107469 A1 | * | 5/2010 | Dunkerley et al. | 43/42.31 |

FOREIGN PATENT DOCUMENTS

| | | | | |
|---|---|---|---|---|
| EP | 2143325 A1 | * | 1/2010 | |
| GB | 2340370 A | * | 2/2000 | |
| GB | 2368509 A | * | 5/2002 | |
| JP | 10127210 A | * | 5/1998 | |
| JP | 10191839 A | * | 7/1998 | |
| JP | 10248441 A | * | 9/1998 | |
| JP | 10276618 A | * | 10/1998 | |
| JP | 11075628 A | * | 3/1999 | |
| JP | 2001000078 A | * | 1/2001 | |
| JP | 2001045920 A | * | 2/2001 | |
| JP | 2002000131 A | * | 1/2002 | |
| JP | 2002119175 A | * | 4/2002 | |
| JP | 2002218865 A | * | 8/2002 | |
| JP | 2003219765 A | * | 8/2003 | |
| JP | 2005210951 A | * | 8/2005 | |
| JP | 2005333890 A | * | 12/2005 | |
| JP | 2006345851 A | * | 12/2006 | |
| JP | 2007000018 A | * | 1/2007 | |
| JP | 2008182994 A | * | 8/2008 | |
| JP | 2009011279 A | * | 1/2009 | |
| JP | 2010068712 A | * | 4/2010 | |

* cited by examiner

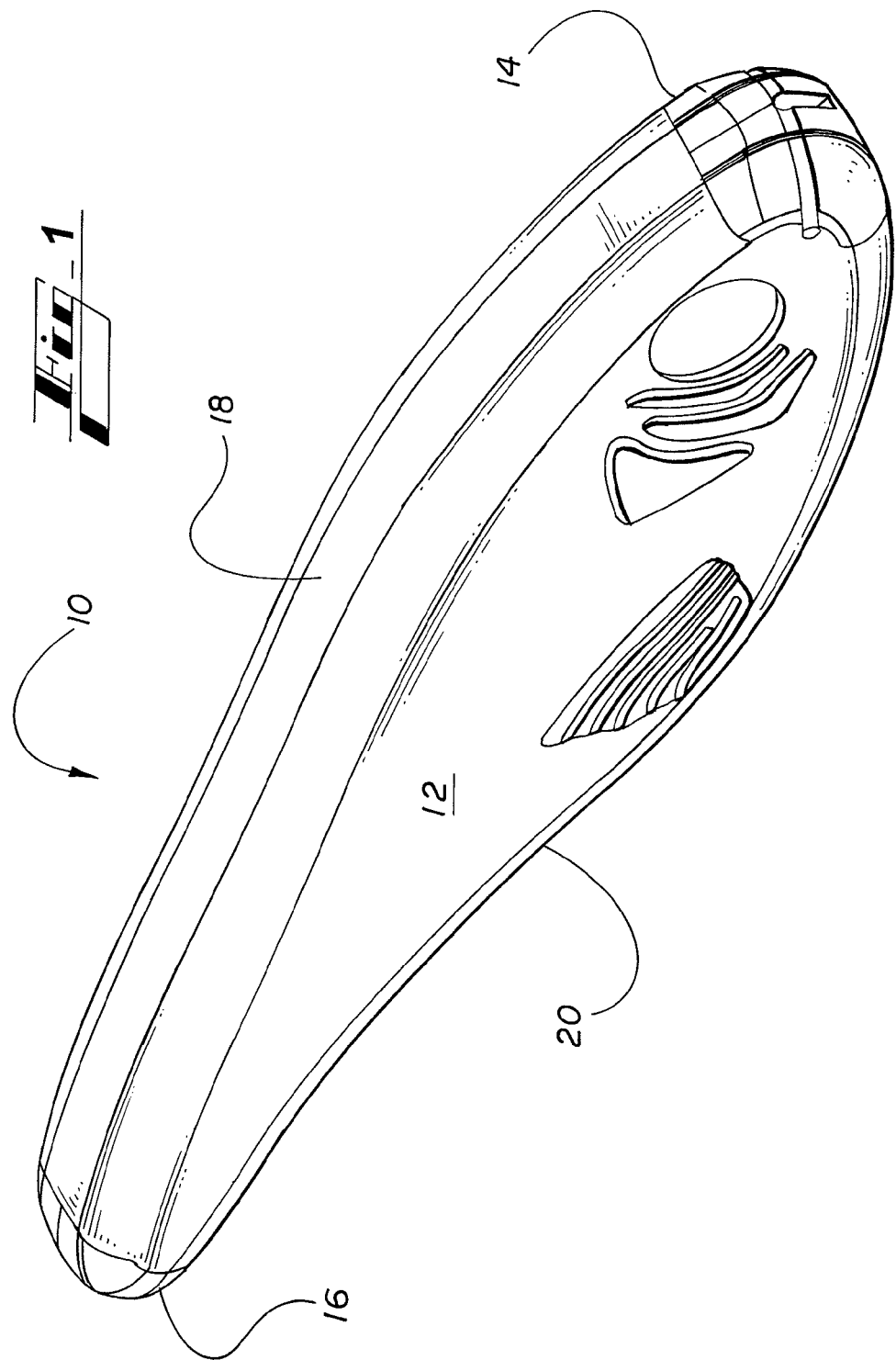

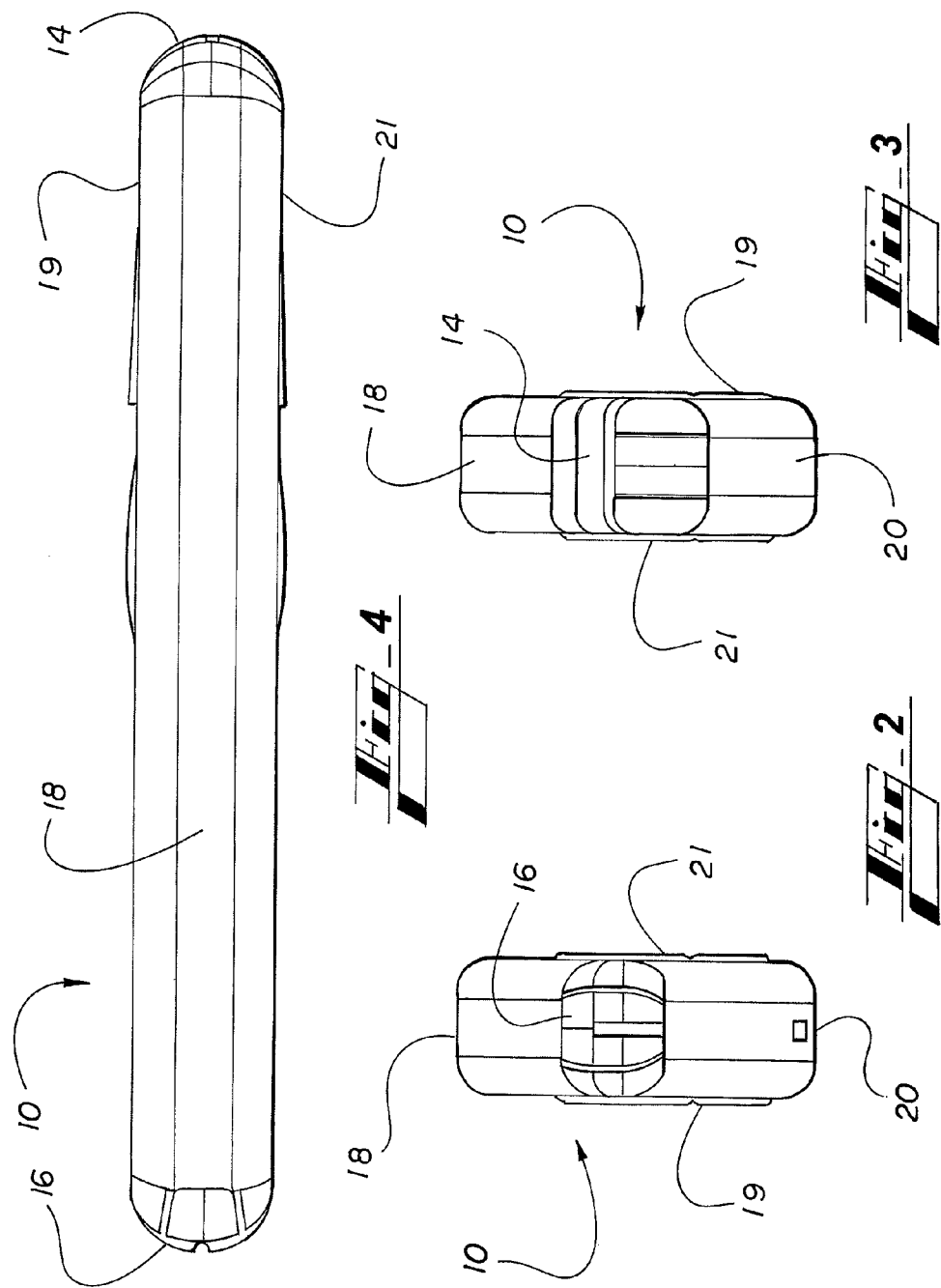

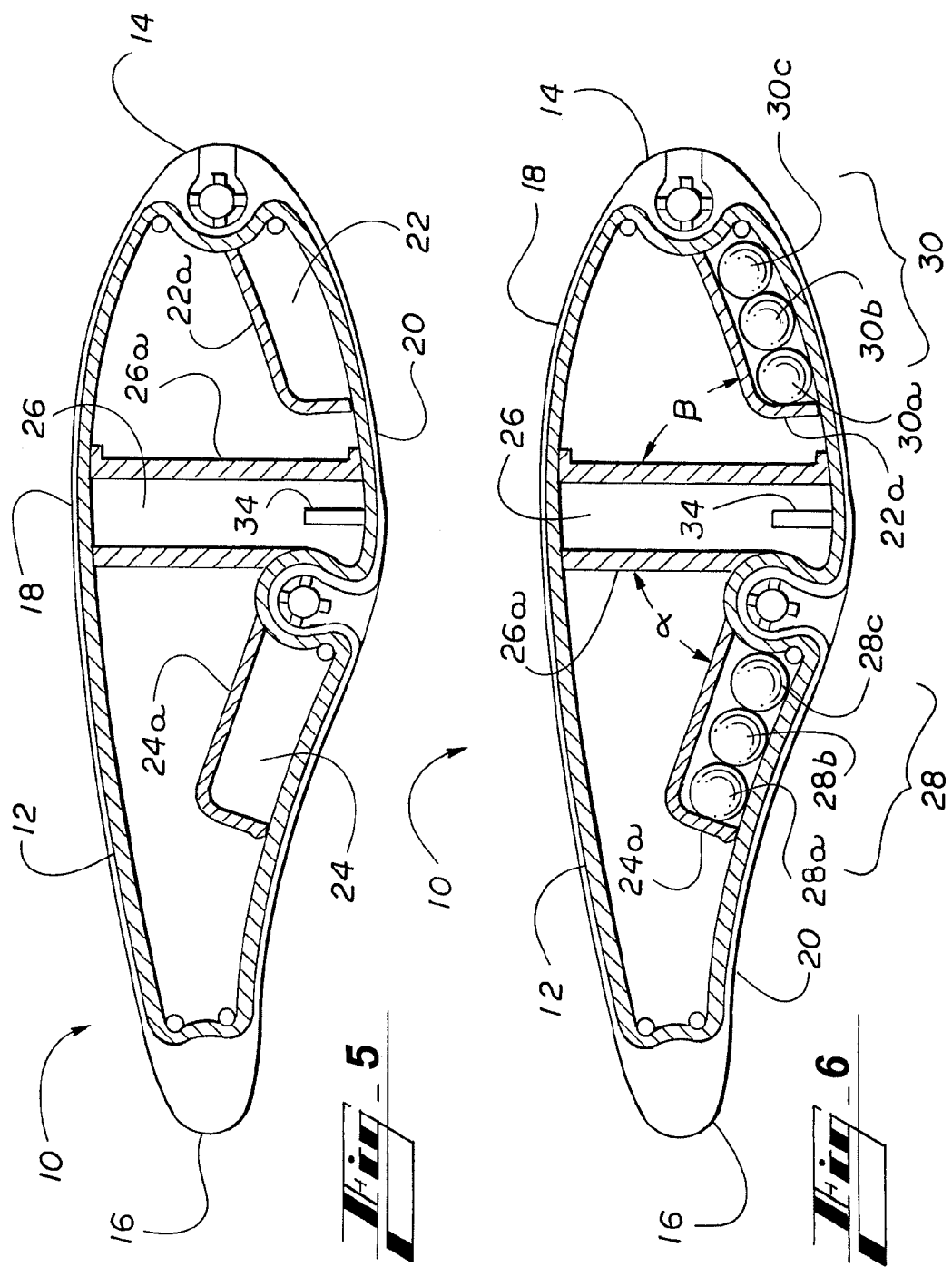

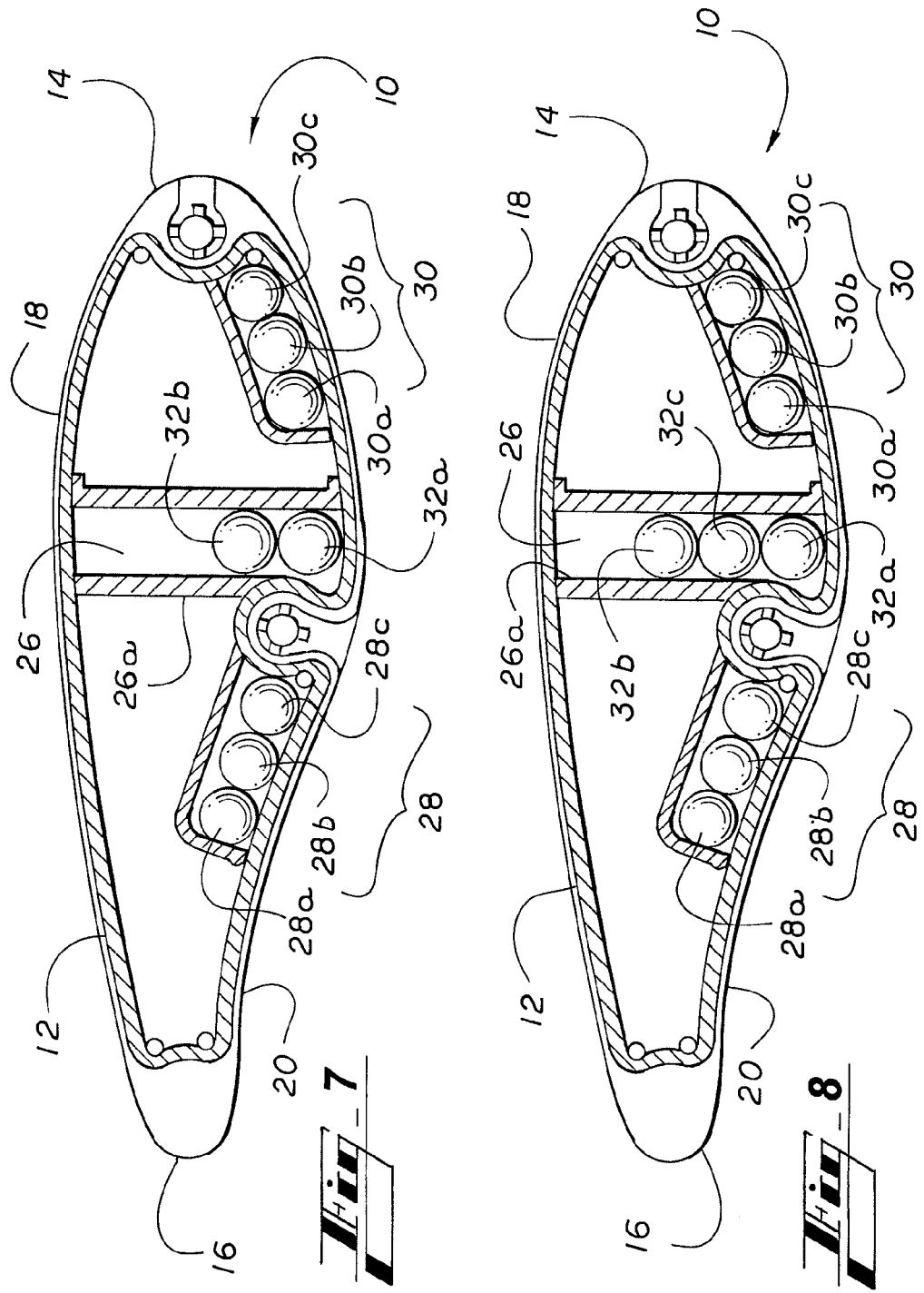

US 8,316,576 B1

DIVING RATTLE LURE

CROSS REFERENCE TO RELATED PATENT APPLICATIONS

This application claims priority from U.S. Provisional Application Ser. No. 61/180,857, filed on May 23, 2009, said application being relied upon and incorporated herein by reference in its entirety.

BACKGROUND OF THE INVENTION

Fishing is a popular activity performed throughout the world for sport and food provision. One of the most important aspects of fishing is to attract fish. That is, fishermen have conventionally used a fishing lure attached to and cast from a fishing pole to attract the desired fish to the lure. The fish must be enticed to attack and bite the lure (and hook attached thereto) in order for the fisherman to be successful in catching the fish.

One of the oldest ways to catch fish is to connect a hook to line connected to the pole and simply put live bait on the hook, such that the motion of the bait will attract the desired fish. In addition to live bait, artificial baits have commonly been used, with innumerable lure designs having the appearance of a fish, frog or other animal that is attractive to fish as a food source. With artificial baits, various accessories are used to attract fish into the general vicinity, such as the realistic appearance of the fishing lure or the creation of particular noises or vibrations in the water to attract the fish.

BRIEF SUMMARY OF THE INVENTION

A fishing lure for producing a desired sound as the lure sinks in a fluid has a proximal end and a distal end, a first side wall and a second side wall between the proximal end and the distal end, and an upper surface and a lower surface between the proximal end and the distal end. A central chamber is positioned in the body between the lower surface and the upper surface and intermediate the front end and the rear end of the body. A rib is positioned in the central chamber proximate the lower surface. An upper weight and a lower weight are housed in the central chamber, with the lower weight detachably lodged proximate the rib in the central chamber. The upper weight pivots about the lower central weight as the lure sinks in the fluid to generate the desired sound vibrations.

The fishing lure additionally includes a first chamber extending substantially lengthwise in the lure body proximate the front end of the lure, with at least one forward weight positioned in the first chamber. A second chamber also extends substantially lengthwise in the lure body, with at least one rear weight positioned in the second chamber, with the weights in the first chamber and the second chamber being used to control the rate at which the lure will sink in fluid. Furthermore, the central chamber is positioned intermediate the first chamber and the second chamber.

BRIEF DESCRIPTION OF THE DRAWINGS

FIG. 1 is a perspective view of a fishing lure described herein;
FIG. 2 is a top plan view of the fishing lure;
FIG. 3 is a front elevational view of the fishing lure;
FIG. 4 is a rear elevational view of the fishing lure;
FIG. 5 is a side sectional view of the fishing lure without any weights;
FIG. 6 is a side sectional view of the fishing lure, including front and rear weights;
FIG. 7 is a side sectional view of the fishing lure, including front, rear and center weights; and
FIG. 8 is a second embodiment of the fishing lure illustrated in FIG. 7.

DETAILED DESCRIPTION OF THE INVENTION

Looking to the attached FIGS. 1-8, a fishing lure 10 that makes a sound or vibration as it sinks slowly into water before being retrieved is illustrated. The fishing lure 10 includes a hollow body 12 or shell having the appearance of an actual fish that is connectable to a fishing rod (not illustrated). In particular, the lure 10 has a forward or proximal end 14 (corresponding to the head of an actual fish) and a rear or distal end 16 (corresponding to the tail of an actual fish). The lure body 12 further has an upper curved surface 18, a lower curved surface 20 opposite the upper surface 18, a first side surface 19 between the upper and lower surfaces 18, 20, and a second side surface 21 opposite the first side surface 19 and also positioned between the upper and lower surfaces 18, 20. The upper and lower surfaces 18, 20 as well as the first and second side surfaces 19, 21 separate the forward end 14 from the rear end 16. The overall shape of the lure body 12 creates a side to side action when allowed to sink in water.

Referring to FIG. 5, three chambers 22, 24, and 26 (or channels) are defined inside the lure body 12 to support one or more weights 30, 28, and 32. In particular, the fishing lure 10 includes a forward or proximal weight chamber 22, a rear or distal weight chamber 24, and a center weight chamber 26 intermediate the forward weight chamber 22 and the rear weight chamber 24. In the embodiment illustrated, the chambers 22, 24, and 26 are defined by proximal, distal, and central chamber walls 22a, 24a and 26a, respectively. The forward weight chamber 22 is positioned proximate the forward end 14 substantially along lower surface of the lure body 12. The rear weight chamber 24 is positioned proximate the rear end 16, also substantially along lower surface 20 of the lure body 12. The center chamber 26 extends crosswise to the length of the lure body 12 from the top surface 18 to the bottom surface 20. In the embodiment illustrated in FIG. 6, there is an angle α that is approximately 35 degrees between the length of the center chamber 26 and the length of the rear chamber 24. Further, there is an angle β that is approximately 75 degrees between the length of the center chamber 26 and the length of the forward chamber 22.

Each chamber 22, 24, and 26 contains at least one weight 30, 28, and 32. The forward weights 28 in the forward chamber 22 and rear weights 30 in the rear chamber 24 are used primarily to add weight to the lure 10 so that it will sink at a desired rate when tossed into water. In the embodiment illustrated in the attached Figures, the front chamber 22 houses three spherical weights 30a, 30b, 30c and the rear chamber 24 houses three spherical weights 28a, 28b, 28c, although more or fewer weights may be included as desired by the user. More specifically, the forward weight chamber 22 houses three 11/32" brass weights 30a, 30b, 30c, and the rear weight chamber 24 houses one 3/8" brass weight 28a and two 11/32" brass weights 28b, 28c. Thus, in this embodiment, the rear weight chamber 24 contains slightly more weight than the forward weight chamber 22. Both the front and rear chambers 22, 24 are sized to hold a predetermined number of weights 30 and 28, such as the three weights illustrated, with the weights 30 and 28 being positioned in these chambers 22, 24 as not intended to generate a substantial noise for attracting fish.

The center chamber 26 will hold at least two weights 32a and 32b, a bottom weight 32a and a rattle weight 32b. In the embodiment illustrated in the attached drawings, the center chamber 26 holds two ⅜" brass weights 32a, 32b, although other sizes may be incorporated as desired by the user. Referring to FIGS. 5 through 7, the at least one rib 34 is positioned within the center chamber 26 proximate the lower surface 20 of the lure body 12 to selectively engage the lowest or bottom weight 32a in the center chamber 26. As a result, the bottom weight 32a will be detachably lodged or locked in the center weight chamber 26 via the rib 34 or ribs to prevent side to side movement of the bottom weight 32a. The locked bottom weight 32a will therefore create a pivot point for the upper weight 32b positioned on top of the bottom weight 32a to allow the upper weights 32b to move side to side in the center chamber 26 as the fishing lure 10 is allowed to sink in water. Thus, the user is able to create the rattle/knock sound desired to attract fish. It is noted that an embodiment of the fishing lure 10 could be without such a rib 34. In such an embodiment, the lure 10 will produce sound, but only if the lure 10 is weighted in the front and rear chambers 22, 24 to sink faster.

In the embodiment illustrated in the drawings, the size of the weights 32 in the center chamber 26 are larger than the weights 30 located in the front chamber 22 and the weights 28 located in the rear chamber 24

In operation, the user will handle the fishing lure 10 so that the bottom center weight 32a will travel to the lowest portion of the center chamber 26 proximate the lower surface 20 of the lure body 12. The bottom center weight 32a may be substantially lodged in place by rib 34. The user will then cast the fishing lure 10 using the fishing rod into the body of water containing the fish that the user desires to catch. The fishing lure 10 will then sink in the water at rate substantially determined by the weights 28 and 30. As the lure 10 sinks, the upper center weight 32b will move side to side in the center chamber 26 about the pivot, bottom weight 32a to contact the side walls 19, 21 and generate a desired noise.

Once the fishing lure 10 sinks to the depth desired by the user, the user will retrieve the lure 10 as desired to attract fish. In one situation, the user will simply slowly retrieve the lure 10 such that there is limited or no movement of the weights 32a, 32b within the center chamber 26. That is, the bottom weight 32a remains lodged by the rib 34 in the center chamber 26 and the upper weight 32b has limited movement. In this case, the lure 10 will make little if any sound as it is retrieved by the user, but will attract fish by the appearance of the lure 10. In contrast, a second retrieving situation provides for the user to quickly jerk the front end 14 of the lure 10 by quickly pivoting the rod connected to the lure 10. As the lure 10 is jerked, the bottom weight 32a will be dislodged from the connection with the rib 34, and both weights 32a, 32b will generate noise to attract fish as the lure 10 is retrieved by the user. Thus, the user will jerk the front end 14 of the lure 10 back and forth as the lure 10 is retrieved to generate the desired noise.

Although the fishing lure 10 is described with the shape illustrated in the drawings, it is noted that the overall shape of the lure 10 may be changed as desired by the user. In addition, the lure body 12 may be made from a synthetic resin or polycarbonate material which will generate a improves the sound level. Other plastic materials could be used for the lure body 12 other than the polycarbonate, but the sound level would change accordingly. Furthermore, as mentioned above, the number of weights 28, 30, and 32 contained in the lure body 12 may be varied as desired by the user. For example, referring to FIG. 8, a second embodiment is illustrated in which the center chamber 26 includes three weights, with one weight 32a still serving as a base, lower weight for the upper two rattle weights 32b, 32c.

Having thus described exemplary embodiments of a DIVING RATTLE LURE, it should be noted by those skilled in the art that the within disclosures are exemplary only and that various other alternatives, adaptations, and modifications may be made within the scope of this disclosure. Accordingly, the invention is not limited to the specific embodiments as illustrated herein, but is only limited by the following claims.

What is claimed is:

1. A fishing lure for producing a desired sound as the lure travels in a fluid, said fishing lure comprising:
   a lure body having a front end, a rear end and a length therebetween;
   a central chamber within said lure body having an axis substantially transverse to said length of said lure body and intermediate said front end and said rear end of said lure body;
   a rib extending into said central chamber substantially parallel to said axis of said central chamber and having a rib width, and
   a rattle weight having a rattle weight width and a bottom weight having a bottom weight width housed in said central chamber, said bottom weight detachably engaging a side of said rib in said central chamber, and said rattle weight pivoting about said bottom weight to generate the desired sound vibrations when delivered into the fluid, such that the combined width of the bottom weight width and said rib width is greater than said rattle weight width.

2. A fishing lure for producing a desired sound as the lure travels in a fluid, said fishing lure comprising:
   a lure body having a front end, a rear end and a length therebetween, a first side wall and a second side wall between said front end and said rear end, and an upper surface and a lower surface between said front end and said rear end;
   a central chamber within said lure body having an axis substantially transverse to said length of said lure body and intermediate said front end and said rear end of said lure body;
   a rib extending into said central chamber substantially parallel to said axis of said central chamber and having a rib width, and
   an upper central weight and a lower central weight housed in said central chamber, said upper central weight having an upper weight width and said lower central weight having a lower weight width, said lower central weight detachably engaging a side of said rib in said central chamber, and said upper central weight pivoting about said lower central weight to generate the desired sound vibrations when delivered into the fluid, such that the combined width of the lower weight width and said rib width is greater than said upper weight width.

3. The fishing lure as described in claim 2 further comprising:
   a first chamber extending substantially lengthwise in said lure body proximate said front end and at least one forward weight in said first chamber;
   a second chamber extending substantially lengthwise in said lure body and at least one rear weight in said second chamber, wherein said central chamber is intermediate said first chamber and said second chamber.

4. The fishing lure as described in claim 3 further comprising:
   a proximal chamber wall positioned within said lure body defining said first chamber;

a distal chamber wall positioned within said lure body defining said second chamber; and at least one central chamber wall positioned within said lure body defining said central chamber.

5. A fishing lure for producing a desired sound as the lure sinks in a fluid, said fishing lure comprising:

a lure body having a proximal end, a distal end, and a length therebetween, a first side wall and a second side wall between said proximal end and said distal end, and an upper surface and a lower surface between said proximal end and said distal end;

a central chamber within said lure body having an axis substantially transverse to said length of said lure body and extending between said lower surface and said upper surface intermediate said front end and said rear end of said lure body;

a rib positioned in said central chamber proximate said lower surface and substantially parallel to said axis of said central chamber, said rib having a rib width; and an upper central weight having an upper weight diameter and a lower central weight having a lower weight diameter housed in said central chamber, said lower central weight detachably engaging a side of said rib in said central chamber, and said upper central weight pivoting about said lower central weight to generate the desired sound vibrations when sinking in the fluid, such that the combined width of the lower weight diameter and said rib width is greater than said upper weight diameter.

6. The fishing lure as described in claim 5 further comprising:

a proximal chamber extending substantially lengthwise in said lure body proximate said proximal end and at least one proximal weight in said proximal chamber;

a distal chamber extending substantially lengthwise in said lure body and at least one distal weight in said distal chamber, wherein said central chamber is intermediate said proximal chamber and said distal chamber.

7. The fishing lure as described in claim 6 further comprising:

a proximal chamber wall positioned within said lure body defining said proximal chamber;

a distal chamber wall positioned within said lure body defining said distal chamber; and at least one central chamber wall positioned within said lure body defining said central chamber.

8. The fishing lure as described in claim 6, wherein said proximal chamber houses three $11/32"$ diameter weights and said distal chamber houses one $3/8"$ diameter weight and two $11/32"$ diameter weights.

9. The fishing lure as described in claim 5, wherein said upper central weight and said lower central weight comprise $3/8"$ diameter weights.

10. The fishing lure as described in claim 5, wherein said lure body is made of a synthetic resin to generate the desired sound when contacted by said upper central weight.

* * * * *